United States Patent Office 2,868,762
Patented Jan. 13, 1959

2,868,762

MIXTURES OF POLYETHYLENES HAVING DIFFERENT MELT VISCOSITIES AND PROCESS OF PREPARING SAME

William George Oakes, Northwich, England, assignor to Imperial Chemical Industries Limited, London, England, a corporation of Great Britain No Drawing. Application December 14, 1954
Serial No. 475,287

Claims priority, application Great Britain
December 21, 1953

4 Claims. (Cl. 260—45.5)

This invention relates to compositions consisting of normally solid polymers of ethylene. Such polymers may be obtained by subjecting ethylene, with a catalyst if desired, to very high pressures and moderately elevated temperatures, for example as described in British Patent No. 471,590. Polymers of this type are usually described as polythenes and will be so referred to in what follows.

Polythenes may possess molecular weights as low as 4000 or as high as 100,000, and it is usual to describe those near the lower end of this range as soft grades and the others as hard grades. The terms "soft" and "hard" are related primarily to the melt viscosity of the polythene as determined under standard conditions which consist essentially of an extrusion at low pressure (such for example as are described in British standard specification No. 1,972 at page 9 or in Government Department electrical specification No. 27, 1950). A soft grade has a low melt viscosity, a hard grade has a high one. The grade may be expressed not in absolute viscosity units but as a melt viscosity number, which is numerically equal to the weight in grammes of polythene that extrudes in 10 minutes under the standard conditions already referred to. Soft grades thus have larger melt viscosities than hard grades. Melt viscosities from about 20 to 200,000 or higher, correspond to soft grades; from about 2 down to 0.002, or lower, to hard grades.

The melt viscosity thus represents the measure of weight rate of extrusion of molten polymer at 190° C. under a constant load. The standard apparatus used for determining grade numbers comprises an aluminum cylinder of ⅜" internal diameter open at the top and fitted at the bottom by an 8 mm. steel disk containing at its center a 2.1 mm. orifice. The cylinder and disk are heated to a temperature of 190° C. and the product to be tested is introduced. Above the surface of the product a piston heated to 190° C. and $^{11}\!/_{32}"$ in diameter is superimposed and upon it a weight is placed giving a combined weight of 2.16 kilo. The weight of product flowing from the orifice in grams per ten minutes is the measure of the melt viscosity.

Polythene is widely used on a large scale for making various articles such as films, tapes, tubes, blocks and many kinds of shaped objects by processes such a extrusion and injection moulding. It often turns out that the harder grades are more suitable for these purposes than the soft because of improved mechanical strength, and since the harder the grade the higher is its melt viscosity it follows that greater power is required to use hard grades than soft in these processes.

It is an object of the present invention to provide a new type of polythenes, classified as hard when measured in a standard low pressure melt viscosity apparatus, but which nevertheless for extrusion at the high pressures and high rates of shear normally employed in commercial fabrication processes do not require the high power that known polythenes of corresponding hard grade do.

We have found that by blending a polythene of very soft grade, i. e. high melt viscosity, with one of very hard grade, i. e. low melt viscosity, we can obtain a mixed polythene which, for extrusion at a high rate of shear, requires only a fraction of the power required at that rate of shear by a normal individual polythene of the same melt viscosity as the mixture. To obtain a mixed polythene having such properties we find that the proportion of the very soft grade in the mixture should be between 25% and 75%, and that of the very hard grade between 75% and 25%. Preferably the very hard grade polythene has a melt viscosity less than 0.2 and the very soft grade a melt viscosity greater than 200. Polythenes of other grades may be incorporated in the mixture provided their combined proportion is only a minor proportion of the mixture as a whole.

According to our invention we prepare and provide homogeneous compositions of polythene by blending two or more polythenes whose melt viscosities as hereinbefore defined differ widely, at least one being high and at least one being low. Preferably the differing grades of polythene employed are such as to have melt viscosities the ratio of the high number to the low being at least 100,000.

Methods of producing the mixture from the individual components include milling the latter together, or passing them through heated mixing rolls or kneading devices at temperatures lying suitably within the range 110°–150° C., or by joint evaporation of solutions of the components in suitable solvents. A different type of method consists in so controlling the reaction during which ethylene is polymerised that two or more grades are produced at the same time in the reaction vessel, blend therein and issue as a homogeneous mixture. This can be brought about in one way by having the vessel divided into zones or compartments by diaphragms which allow flow of polymer and unreacted ethylene in one direction only. Polymer of one grade is continuously formed in the first compartment and passes with unreacted ethylene to the next where by suitably controlling the reaction conditions of temperature and pressure, using a suitable catalyst if desired, a polymer of a different grade is continually formed from the unreacted ethylene and then blends with the first polymer. This blend may then, if desired, pass on to a third compartment, and so on. Alternatively, two or more separate reaction vessels may be used connected in series by suitable pipes fitted with non-return valves. Yet another manner of bringing about the desired result is to arrange for two or more separate reaction vessels to feed into a common receiving vessel or separator in which the pressure and temperature are maintained at such levels that the polythene remains dissolved or dispersed in the ethylene. Different catalysts may if desired be used in different reaction vessels, or in different compartments of the same vessel.

It is surprising and unexpected to discover that mixtures of polythenes of widely differing grades require so much less power for extrusion at high rates of shear than do individual polythenes of conventional type having melt viscosities similar to those of the mixtures. That this is so may be understood when it is realised that other physical properties of such mixtures, for example tensile strength, softening point, brittle point, density, are not significantly different from those of normal individual polythenes of corresponding melt viscosities. There is in fact an essentially linear relation between the logarithm of melt viscosity and the numerical value of such properties expressed in appropriate units. From this relation one can with fair accuracy predict the value of a particular property that a mixture of given grades will possess, but not, as we have so surprisingly discovered, extrusion properties at high rates of shear and high pressures.

The products of the invention are particularly useful for fabrication into articles and film by the usual processes of extrusion, moulding and casting, all of which are enabled thereby to operate with great saving in power, or with much increased output over their normal practice with hitherto known polythenes.

An example will illustrate our discovery. Sixty parts by weight of a polythene of melt viscosity 0.002 were blended with 40 parts by weight of another polythene having a melt viscosity of 200,000. The melt viscosity of the mixture as determined by the standard methods hereinbefore described was approximately 2.0. The power required to extrude the mixture at high shear rates was only one-seventh of that required to extrude normal polythene of a melt viscosity of 2 at the same rates. The softening point, the tensile strength and the density of the mixture were not significantly different from those of normal polythene of a melt viscosity of 2.

In another example, seventy-five parts by weight of a polythene of melt viscosity 0.2 were blended with 25 parts by weight of a polythene of melt viscosity 70,000. The melt viscosity of the mixture was approximately 2.0 and the power required to extrude it at high shear rates was one-fifth of that required for normal unblended polythene of the same melt viscosity at the same rates. Apart from the Vicat softening point, which was two or three centigrade degrees above the average for normal polythene of this grade, the other physical properties of the mixture were not significantly different from those of the normal polythene.

In yet another example, 30 parts by weight of a polythene of melt viscosity 0.002 were mixed with 70 parts by weight of a polythene of melt viscosity 200. The melt viscosity of the mixture was approximately 2.0 and the power required to extrude it at high shear rates was about one quarter of that required for normal unblended polythene. The physical properties such as softening point, tensile strength and density were indistinguishable from those of normal unblended polythene.

What I claim is:

1. A homogeneous polythene composition characterized by being extrudable at high pressures and high rates of shear with a minimum of power, said composition consisting essentially of a blended mixture of a first polyethylene in an amount from 25% to 75% by weight and having a melt viscosity less than 0.2 and a second polyethylene in an amount from 75% to 25% by weight and having a melt viscosity greater than 200 and where the ratio of the melt viscosity of said second polyethylene to the melt viscosity of said first polyethylene is at least 100,000 to 1.

2. A process for making homogeneous compositions of at least two polyethylenes of the type claimed in claim 1 which comprises the steps of polymerizing ethylene in different reaction zones of the same reaction vessel to form said polyethylenes differing in melt viscosity from each other, and blending together, while still in said reaction vessel, said polyethylenes of different melt viscosities.

3. A process of making homogeneous compositions of at least two polyethylenes of the type claimed in claim 1 which comprises the steps of polymerizing ethylene in separate interconnected reaction vessels to form said polyethylenes of different melt viscosities and allowing the polyethylene formed in one vessel to flow into another vessel, thereby blending with the polyethylene formed in said other vessel.

4. A process for making homogeneous compositions of at least two polyethylenes of the type of claim 1 which comprises mixing together at least two of said polyethylenes of different melt viscosity at a temperature within the range of 110–150° C.

References Cited in the file of this patent

UNITED STATES PATENTS

| 2,388,160 | Krase | Oct. 30, 1945 |
| 2,692,259 | Peters | Oct. 19, 1954 |

OTHER REFERENCES

Robertson: India Rubber World, 127, page 80 (October 1952).

Billmeyer: J. Am. Chem. Soc., 75, page 6121 (December 1953).